Oct. 18, 1960 — L. W. TOELKE — 2,956,625
DUMP BAILER
Filed May 11, 1959 — 4 Sheets-Sheet 1
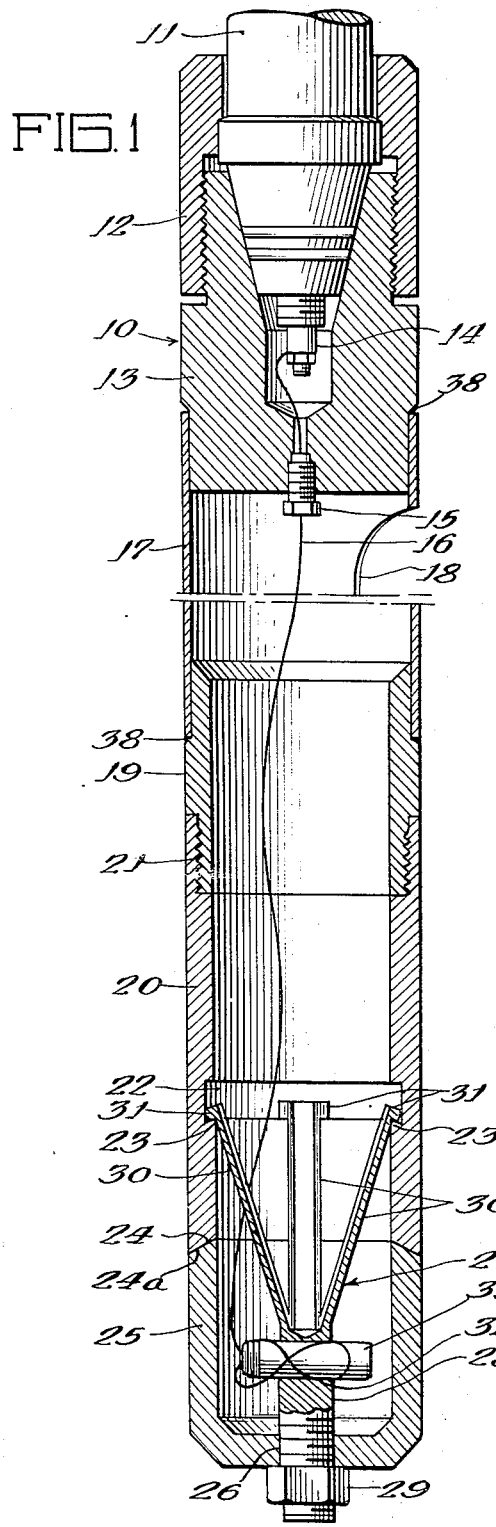
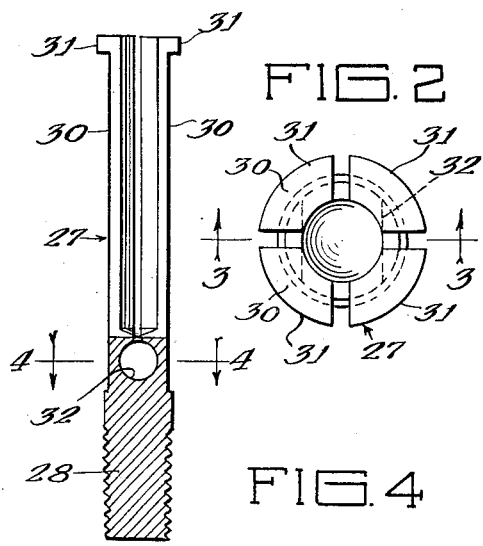
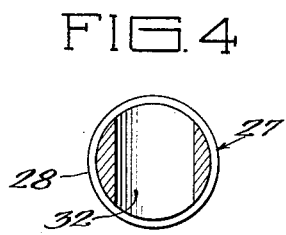
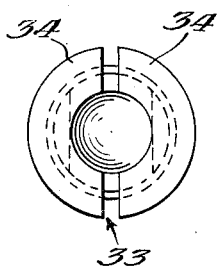
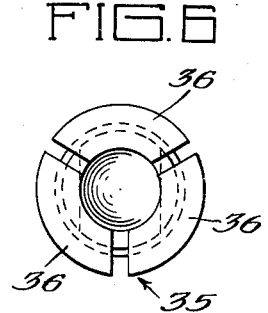
Inventor:
Lester W. Toelke
By: Carl F. Peters
Attorney

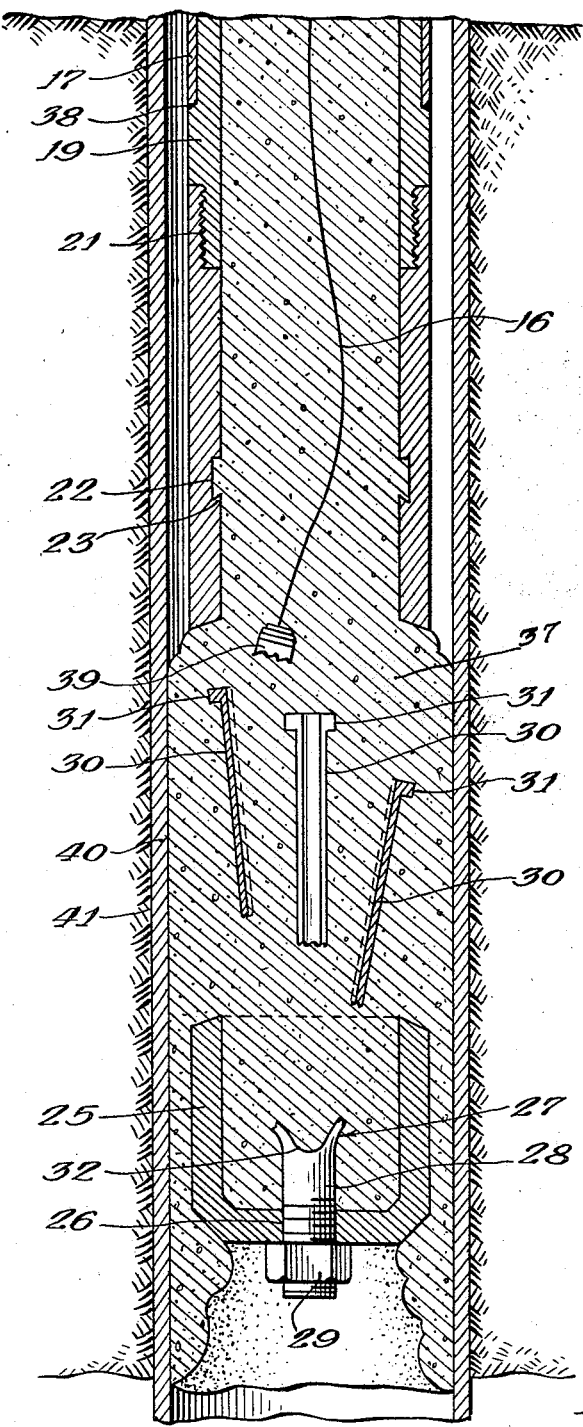

Oct. 18, 1960     L. W. TOELKE     2,956,625
DUMP BAILER
Filed May 11, 1959     4 Sheets-Sheet 3
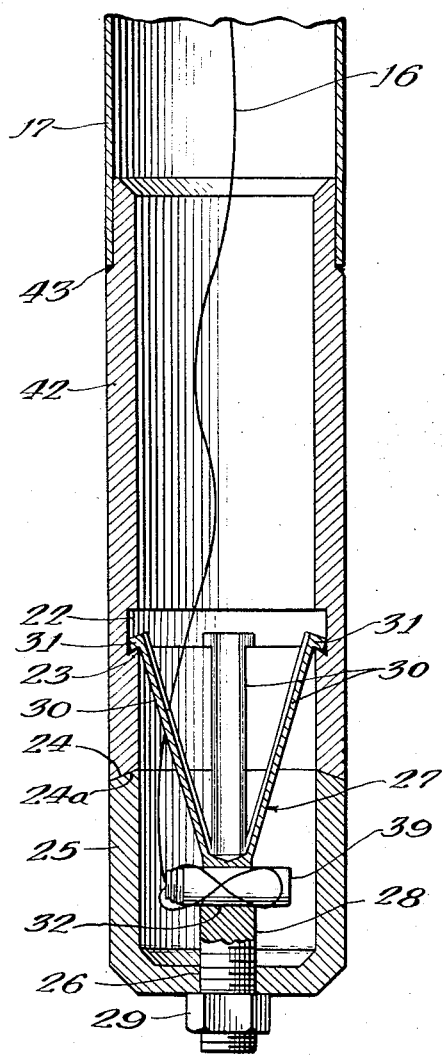
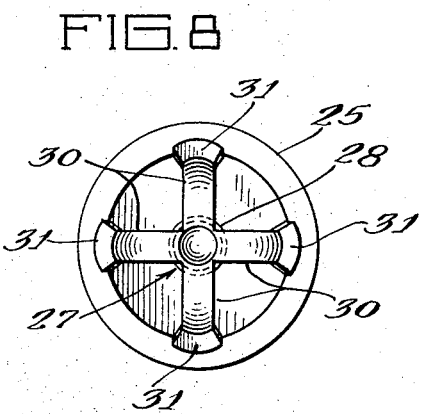
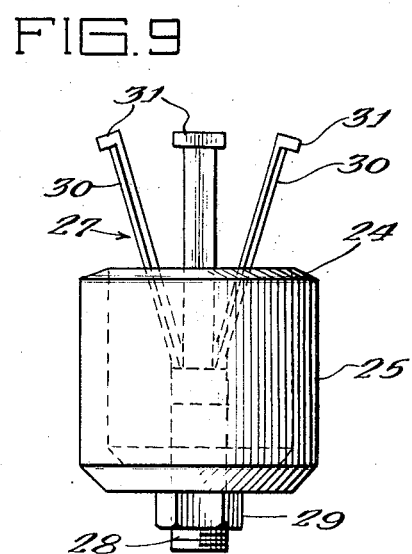

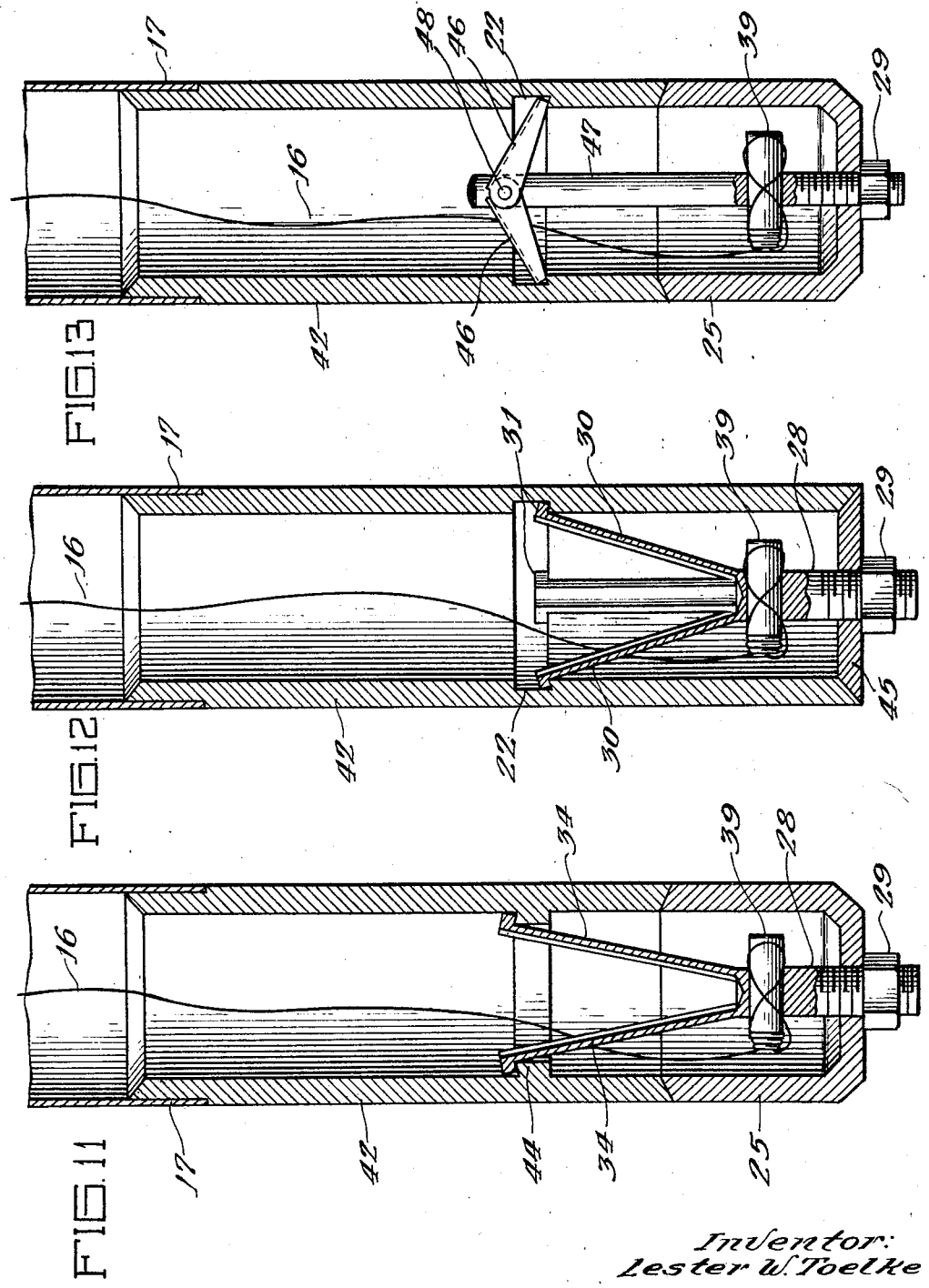

United States Patent Office 2,956,625
Patented Oct. 18, 1960

2,956,625

DUMP BAILER

Lester W. Toelke, Houston, Tex., assignor to Great Lakes Carbon Corporation, New York, N.Y., a corporation of Delaware Filed May 11, 1959, Ser. No. 812,542

8 Claims. (Cl. 166—63)

This invention relates to a well tool designed for the running and dumping of substances, either liquid or solid, in well bores. More particularly, this invention relates to a device known as a dump bailer which is employed in depositing various substances such as cement, sand and gravel, liquid or semi-liquid chemicals and plastic materials for the purpose of plugging, sealing or otherwise treating well bores.

The present invention will be described as being particularly suitable for the lowering, dumping and depositing of cement or gravel into a well at a certain predetermined point, although it will be understood that the invention is equally applicable to the transporting of chemicals and plastic materials for the treating, plugging and sealing of well bores. The device of the present invention is particularly well adapted for lowering through well production tubing, thereby obviating the necessity for withdrawing the tubing prior to running the dump bailer. However, it should be understood that the device is equally useful in lowering and placing substances in well casing, the tubing having been either previously removed or not yet in place.

The use of a dump bailer generally follows the placement of a bridge plug in order to facilitate cement placement to minimize or prevent leakage of fluids, such as drilling muds, from the well. A dump bailer is also used to place gravel in a well for gravel packing a formation and for use as a shot tamping medium, the latter practice being employed in geophysical work and where nitroglycerine is employed for shooting wells. However, the most common use for the dump bailer of the present invention is the placement of cement on top of a bridge plug where a well bore is to be abandoned.

The majority of dump bailers presently in use require a solid bottom on which to set down in order to release a mechanical valve or similar device to permit dumping of the material from the bailer. Mechanical release bottom bailers cannot, therefore, be used for more than one run when cement is dumped. Another dump bailer design requires the use of a glass container placed inside a steel housing which has a closed bottom. The housing has slots or windows which permit the cement to flow out after the glass liner has been shattered, usually by explosive means. This particular design has certain limitations because the viscosity and weight of the cement, if high, will inhibit proper discharge and placement of the cement from the bailer.

The present invention has for its principal object the elimination of the difficulties of the above described devices and provides a means whereby the contents of the bailer can be released and deposited in the well bore in an effective as well as simple manner.

It is a further object of the invention to provide a dump bailer mechanism which eliminates the requirements for solid bottoms in well bores which are required to actuate mechanical release bottom bailers.

It is a further object of the invention to provide a dump bailer which has a completely removable bottom and can be withdrawn from the well bore with the tubular portion of the dump bailer in a full-open position.

It is a further object of the invention to provide a dump bailer mechanism which, when withdrawn from the well bore, will permit the well fluid to wash through the tubular portion of the dump bailer and exit from the bottom thereof without restriction, thereby removing the entire contents of the bailer quickly and effectively.

It is a further object of the invention to provide a dump bailer mechanism which can be lowered through well-production tubing and which can be withdrawn through the tubing after the contents of the bailer have been dumped.

The above and more specific objects of the invention will become apparent from the following detailed description and the drawings which illustrate a particularly useful embodiment of the invention.

Broadly speaking the present invention consists of a dump bailer which combines certain standard features heretofore known in devices of this type together with innovations which form the basis of the invention. The conventional portions of the dump bailer include a tubular body and a closure for the upper end of the body including means for securing the tubular body to a lowering cable equipped with electric-current carrying leads which traverse the tubular body from top to bottom. The tubular body is characterized by at least one opening or window in the wall which facilitates loading of the materials into the dump bailer and also permtis access of well fluids into the dump bailer after the contents thereof have been dumped and placed in the well bore. The essence of the present invention lies in a combination, with the foregoing elements, which comprises a separate bottom closure which is held in abutting relationship and under compression against the bottom end face of the tubular bailer body by means of a specially designed frangible bolt or shear stud which is secured at one end to the bottom closure, the other end of said bolt extending into the bottom portion of the tubular bailer body. This bolt has outwardly distended or extended arms less than 90° from the longitudinal axis of the bolt, which frictionally engage and secure themselves to the inner wall of the tubular bailer body. There is also provided means for electrically firing an explosive charge, the latter being maintained in contact with the frangible bolt which will shatter when the charge is exploded. Upon fragmentation of the bolt, the bottom closure is automatically released and the contents of the dump bailer will be evacuated into the well bore at a predetermined position.

Reference is now made to the drawings which illustrate particularly useful forms of the invention.

Figure 1 is a vertical section of one form of the dump bailer of the invention;

Figure 2 is a plan view of the frangible shear stud or connecting bolt illustrated in Figure 1;

Figure 3 is a section taken along line 3—3 of Figure 2;

Figure 4 is a section taken along the line 4—4 of Figure 3;

Figure 5 is a plan view of a two-arm form of the shear stud which is an integral part of the invention;

Figure 6 is a plan view of another form of shear stud showing three arms;

Figure 7 is a vertical section of one form of invention, shown after the shear stud is explosively fragmented;

Figure 8 is a plan view of the bottom closure and four-arm shear stud;

Figure 9 is a side elevation of the device shown in Figure 8;

Figures 10, 11, 12 and 13 are vertical sections of modified forms of the invention.

In the drawings, the bailer which is designated generally by the numeral 10, is secured to a conventional universal rope socket 11 employed to lower the device into a well casing 40. The dump bailer comprises one or more tubular sections 17 which are fastened together by means of connectors 19, and to the rope socket by means of top closure connector 13. The connectors and tubular sections are preferably joined by spot welding 38. It will be understood that as many sections of pipe and connectors may be employed as is desirable to provide a container of suitable length to carry the desired amount of material to be dumped and placed in the well bore. The rope socket 11 is secured in the upper portion of the bailer by a suitable top closure plug 13 by means of threaded, fluid-tight collar 12. An electrical connection is made at the end of the rope socket lead wire connector 14. Where the lead wire 16 emerges from the top closure connector a seal of plastic material and seal nut 15 are used to form a fluid- and pressure-tight seal. The lead wire 16 is then threaded down through the tubular sections of the bailer to the bottom thereof. The upper tubular section of the bailer is provided with at least one opening 18 through which material is introduced into the dump bailer as by means of a funnel.

The foregoing components of the dump bailer are conventional.

The bottom portion of the dump bailer, which is the essence of the present invention, comprises a sleeve 20 which is threadably (21) or otherwise secured to an adapter-connector 19 (as in Fig. 1). Alternatively, a sleeve 42 may be secured directly to the bottom tubular section 17, as shown in Fig. 10. On the open bottom end of the sleeve is placed a cup- or dish-shaped bottom receptacle closure 25. In operation of the bailer, the bottom closure will abut and be held under compression against the bottom or open end face of sleeve 20, as shown in Figures 1, 7, and 10 to 13 in order to prevent loss of solids or liquids which are held inside the sleeve 20 and any tubular sections 17 not having an opening or openings therein. The bottom end face of sleeve 20 and the closure face of the receptacle 25 are preferably bevelled, this being shown by numerals 24 and 24a, respectively. A frangible shear stud or bolt 27, threaded at one end (28), is passed through a hole 26 in the bottom closure 25 and is retained by means of a nut 29 or equivalent fastening means. The upper portion of the shear stud 27 is preferably in the form of a finger-type bolt or collet (as shown in Figure 3) having projections 31 at the extremities of four collet arms 30. When assembling the dump bailer, the arms 30 are sprung outwardly or distended in order to frictionally engage and secure themselves in an annular recess 22 in the inside wall of the tubular body or sleeve 20 near its bottom end. In Figures 1, 10 and 12 the projections 31 overlie and are seated and frictionally secured in an annular recess or groove 22. The receptacle 25 is secured in place and held under compression against the bottom end face 24 of sleeve 20 by drawing up nut 29 against the outside face of receptacle 25. Sufficient tension is exerted on shear stud 27 so as to prevent loss of solids or liquids which are held inside sleeve 20 and the tubular sections 17. The lower, solid and threaded portion 28 of the shear stud is drilled to provide an aperture 32 for securing an explosive cartridge or squib 39 which is connected to the electric lead 16.

The shear stud 27 is constructed of frangible material such as aluminum metal or a plastic material which is capable of shattering upon the firing of the explosive cartridge 39 which is maintained in contact with the solid portion of the shear stud.

The shear stud 27 will have at least two outwardly extending arms 30, as shown in Figures 5 and 13, but it may have 3 or 4 arms as shown in Figures 6 and 2, respectively. The groove 22 need not be annular, but may consist of at least two recesses appropriately and preferably equidistantly machined in the inside wall of sleeve 20 so as to register with the projections 31 of any desired number of extending arms 30. Alternatively, the groove 22 may be replaced by a shoulder 44, shown in Figure 11, which may be either annular or equidistantly segmented.

In a further embodiment of the invention, the shear stud may be in the form of a spring-wing toggle bolt, as shown in Figure 13. To the shank 47 of the bolt are attached toggles 46 by means of a pivot 48. The toggles are spring-loaded, the springs not being shown as this structure is conventional and known to those skilled in the art. The toggles 46 are seated and frictionally secured in recess 22 and the explosive cartridge 39 is secured to the shank 47 of the bolt, as described herein.

In a further embodiment of the invention, the receptacle or cup 25 can be replaced by means of a bottom plate 45, as shown in Figure 12. The closure is preferably effected by bevelling the bottom end face of the sleeve 42, and correspondingly bevelling the peripheral edge of the plate 45.

The dump bailer is operated in the following manner. The bailer is assembled as shown and the electric lead wire 16 (which is insulated) is threaded through the bailer and attached to the explosive cartridge 39. The explosive cartridge is shielded both mechanically and electrically by means of a conventional waterproof sleeve (not shown). This explosive cartridge 39 is secured in the aperture 32 and is also suitably grounded. The arms 30 of the collet-type shear stud 27 are extended upwardly and outwardly so that the projections 31 will seat in the recess of groove 22. The bottom receptacle 25 is then secured to the bottom end face of sleeve 20 so that the bevelled surfaces 24 and 24a will register by having the threaded end 28 of the shear stud project through the opening 26 in the bottom receptacle. A nut 29 is drawn up on the protruding threaded end of the shear stud against the bottom outside face of the receptacle until a fluid-tight closure is effected between the bevelled surfaces 24 and 24a. The bailer is then placed in a well bore 41 in which is positioned a casing 40, so that the tubular section having at least one opening or window section 18 is just above the casing head. The bailer is then filled with cement or other material and lowered to the desired depth. The conductor cable 16 is energized resulting in detonation of the explosive cartridge 39. As shown in Figure 7, the explosion shears the stud or bolt 27 allowing the bottom receptacle 25 to fall away freely, thereby affording a full opening bottom in the bailer, permitting the cement or gravel 37, or other material, to evacuate into the casing. The bottom receptacle 25, the threaded portion 28 of the shear stud, the nut 29, and the arms 30 will remain in the hole but because these parts are usually made of aluminum or other soft material they will not interfere with subsequent operations.

In the event that the bailer is to be used for dumping acid, a cast iron bottom receptacle and shear stud can be used, the explosive cartridge being then encased in appropriate resistant material.

Figures 10 to 13 illustrate embodiments of the invention in which the connector-adapter 19 (of Figure 1) is eliminated and the sleeve 42 is secured directly to the bottom tubular section 17 of the bailer, for example by means of spotwelding 43. In Figure 1, the tubular section 17 is secured to the adapter 19 by spotwelding 38.

Figure 5 shows a modified form 33 of the shear stud having two arms 34 which can be outwardly extended to be secured in recess 22.

Figure 6 shows another form 35 of the shear stud having three arms 36.

Figure 2 shows a preferred form of shear stud 27, having four arms 30.

It will be understood that various changes and modifications may be made in the details illustrating the preferred embodiment of the invention. For example, the dish-shaped cup or receptacle 25 may be replaced with a flat bottom plate 45, or the bottom closure may have other suitable shapes. Also, the quantity of the explosive required to shear the stud or bolt 27 will be variable depending upon the material of construction, and the cross-sectional area to be shattered. The explosive cartridge 39 may also be fixed to the shear stud 27 by means other than insertion in a drilled aperture 32. While aluminum is the preferred material for the shear stud it is to be understood that other frangible materials may also be employed.

It will, therefore, be seen that the bailer of the present invention eliminates undersirable characteristics of the bailers of the prior art. As many runs can be made as desired with the bailer of the present invention without a well bottom. Furthermore, when the bailer is withdrawn, the well fluid will wash through the window of the tubular sections and out the bottom of the bailer without restriction, thereby removing the entire contents of the bailer quickly and effectively.

This application is a continuation-in-part of my previously filed application for Dump Bailer, Serial No. 726,360, filed April 4, 1958.

Having thus described, both generally and specifically, the details of the invention, what I claim and desire to secure by Letters Patent is:

1. In a dump bailer for wells including a tubular body, a closure for the upper end of said body including means for securing said body to a lowering cable equipped with electric current-carrying leads which traverse said body, and at least one opening in the wall of said body intermediate said closure and the bottom of the bailer; the improvement comprising a bottom closure held in abutting relationship and under compression against the bottom end face of the tubular body by means of a frangible bolt, means securing one end of said frangible bolt to the bottom closure, the other end of said bolt extending into the bottom portion of the tubular body and having outwardly distended arms which frictionally engage and secure themselves to the inner wall of the tubular body, and an electrically fired explosive charge maintained in contact with said bolt adapted to shatter the same upon firing of the explosive whereby said bottom closure is released.

2. In a dump bailer for wells including a tubular body, a closure for the upper end of said body including means for securing said body to lowering cable equipped with electric current-carrying leads which traverse said body, and at least one opening in the wall of said body intermediate said closure and the bottom of the bailer; the improvement comprising an annular recess in the inside wall of the tubular body near its bottom end, a bottom closure held in abutting relationship and under compression against the bottom end face of the tubular body by means of a frangible bolt, means securing one end of said frangible bolt to the bottom closure, the other end of said bolt extending into the bottom portion of the tubular body and having at least two outwardly extending arms whose ends are seated and secured in said recess, and an electrically fired explosive charge maintained in contact with said bolt adapted to shatter the same upon firing of the explosive whereby said bottom closure is released.

3. A device according to claim 2 wherein said bolt has four outwardly extending arms.

4. In a dump bailer for wells including a tubular body, a closure for the upper end of said body including means for securing said body to a lowering cable equipped with electric current-carrying leads which traverse said body, and at least one opening in the wall of said body intermediate said closure and the bottom of the bailer; the improvement comprising an annular shoulder on the inside wall of the tubular body near its bottom end, a bottom closure held in abutting relationship and under compression against the bottom end face of the tubular body by means of a frangible bolt, means securing one end of said frangible bolt to the bottom closure, the other end of said bolt extending into the bottom portion of the tubular body and having at least two outwardly distended arms whose ends overlie and frictionally engage said shoulder, and an electrically fired explosive charge maintained in contact with said bolt adapted to shatter the same upon firing of the explosive whereby said bottom closure is released.

5. In a dump bailer for wells including a tubular body, a closure for the upper end of said body including means for securing said body to a lowering cable equipped with electric current-carrying leads which traverse said body and at least one opening in the wall of said body intermediate said closure and the bottom of the bailer; the improvement comprising a sleeve secured to the bottom of said tubular body, a dish-shaped bottom closure held in abutting relationship and under compression against the bottom end face of said sleeve by means of a frangible bolt, means securing one end of said frangible bolt to the bottom closure, the other end of said bolt extending into the bottom portion of said sleeve and having outwardly distended arms which frictionally engage and secure themselves to the inner wall of the tubular body, and an electrically fired explosive charge maintained in contact with said bolt adapted to shatter the same upon firing of the explosive whereby said bottom closure is released.

6. In a dump bailer for wells including a tubular body, a closure for the upper end of said body including means for securing said body to a lowering cable equipped with electric current-carrying leads which traverse said body and at least one opening in the wall of said body intermediate said closure and the bottom of the bailer; the improvement comprising a sleeve secured to the bottom of said tubular body, an annular recess in the inside wall of said sleeve near its bottom end, a bottom closure held in abutting relationship and under compression against the bottom end face of the sleeve by means of a frangible bolt, means securing one end of said frangible bolt to the bottom closure, the other end of said bolt extending into the bottom portion of said sleeve and having at least two outwardly extending arms whose ends are seated and secured in said recess, and an electrically fired explosive charge maintained in contact with said bolt adapted to shatter the same upon firing of the explosive whereby said bottom closure is released.

7. A device according to claim 6 wherein said bolt has four outwardly extending arms.

8. In a dump bailer for wells including a tubular body, a closure for the upper end of said body including means for securing said body to a lowering cable equipped with electric current-carrying leads which traverse said body and at least one opening in the wall of said body intermediate said closure and the bottom of the bailer; the improvement comprising a sleeve secured to the bottom of said tubular body, an annular shoulder on the inside wall of said sleeve near its bottom end, a dish-shaped bottom closure held in abutting relationship and under compression against the bottom end face of the sleeve by means of a frangible bolt, means securing one end of said frangible bolt to the bottom closure, the other end of said bolt extending into the bottom portion of said sleeve and having at least two outwardly extending arms whose ends overlie and frictionally engage said shoulder, and an electrically fired explosive charge maintained in contact with said bolt adapted to shatter the same upon firing of the explosive whereby said bottom closure is released.

References Cited in the file of this patent

UNITED STATES PATENTS

| | | |
|---|---|---|
| 1,131,085 | Reilly | Mar. 9, 1915 |
| 2,059,538 | Sloan | Nov. 3, 1936 |
| 2,569,893 | Kendall et al. | Oct. 2, 1951 |
| 2,616,327 | Karitzky | Nov. 4, 1952 |
| 2,725,940 | Shidell et al. | Dec. 6, 1955 |
| 2,795,280 | Sartain | June 11, 1957 |